UNITED STATES PATENT OFFICE.

HENRY J. KAMPMAN, OF STANFORD, ILLINOIS.

IMPROVEMENT IN BITTERS.

Specification forming part of Letters Patent No. 219,957, dated September 23, 1879; application filed June 10, 1879.

*To all whom it may concern:*

Be it known that I, HENRY J. KAMPMAN, of Stanford, in the county of McLean and State of Illinois, have invented certain new and useful Improvements in Bitters; and I do hereby declare that the following is a full, clear, and exact description of the invention, which will enable others skilled in the art to which it appertains to make and use the same.

In the process of preparing my stomach-bitters, I first take four ounces of cinnamon-bark; three ounces of pimento, (unground;) three ounces of cloves; one-half ounce of cardamom-seed; one ounce of galanga-root; one ounce of ginger-root; one ounce of nutmeg; one-fourth ounce of capsicum, (ground.) These ingredients, after having been first crushed together, are placed in a glass jar or other suitable receptacle, to which are added three and one-fourth pints of alcohol. The receptacle is then made as nearly air-tight as possible, and in this condition the vegetable ingredients are steeped for the period of eight days, and during this time shaken three or four times daily. I then take one-tenth part of the above essence, to which I add ten times as much good whisky, and one-half as much simple sirup as essence, and as much tincture of vanilla as essence; but prior to the use of the tincture of vanilla I take the vegetable vanilla, and immerse it in alcohol or other spirits, and pour the same off the vegetable when ready, and mixing these ingredients completes the process of preparing the bitters.

What I claim, and desire to secure by Letters Patent, is—

A medical compound or bitters consisting of cinnamon-bark, pimento, (unground,) cloves, cardamom-seed, galanga, ginger-root, nutmeg, alcohol and whisky, and capsicum, (ground,) simple sirup, and tincture of vanilla, prepared and compounded in the proportions and manner substantially as set forth.

In testimony that I claim the foregoing as my own I affix my signature in presence of two witnesses.

HENRY J. KAMPMAN.

Witnesses:
JAMES F. RHODECAP,
HENRY L. RUSMISELL.